US012766812B2

(12) United States Patent
Levine et al.

(10) Patent No.: US 12,766,812 B2
(45) Date of Patent: Oct. 20, 2026

(54) HIGH PERMEABILITY TEXTURING BELT

(71) Applicant: Albany International Corp., Rochester, NH (US)

(72) Inventors: Mark J. Levine, Appleton, WI (US); Erin Lynn Camponeschi Brotherson, Avondale, PA (US)

(73) Assignee: Albany International Corp., Portsmouth, NH (US)

( * ) Notice: Subject to any disclaimer, the term of this patent is extended or adjusted under 35 U.S.C. 154(b) by 0 days.

(21) Appl. No.: 17/899,966

(22) Filed: Aug. 31, 2022

(65) Prior Publication Data

US 2023/0074867 A1 Mar. 9, 2023

Related U.S. Application Data

(60) Provisional application No. 63/240,542, filed on Sep. 3, 2021.

(51) Int. Cl.

*B32B 7/05* (2019.01)
*B32B 3/26* (2006.01)
*B32B 33/00* (2006.01)
*B32B 37/20* (2006.01)
*B32B 38/00* (2006.01)

(52) U.S. Cl.

CPC .................. *B32B 7/05* (2019.01); *B32B 3/26* (2013.01); *B32B 33/00* (2013.01); *B32B 37/203* (2013.01); *B32B 38/0008* (2013.01); *B32B 2250/02* (2013.01); *B32B 2305/026* (2013.01); *B32B 2305/18* (2013.01); *B32B 2307/724* (2013.01); *B32B 2310/0843* (2013.01)

(58) Field of Classification Search

CPC .. B32B 5/26; B32B 5/22; B32B 5/024; B32B 5/022

See application file for complete search history.

(56) References Cited

U.S. PATENT DOCUMENTS 4,514,345 A 4/1985 Johnson et al.
4,528,239 A * 7/1985 Trokhan ................ D21F 11/006 442/33

(Continued)

FOREIGN PATENT DOCUMENTS

CN 102264970 A 11/2011
CN 110234500 A 9/2019

(Continued)

OTHER PUBLICATIONS merriam-webster.com/dictionary/nominal accessed Jan. 28, 2025.*

(Continued)

*Primary Examiner* — Alicia J Weydemeyer
(74) *Attorney, Agent, or Firm* — Fish & Richardson P.C.

(57) ABSTRACT

The instant invention relates to an industrial fabric for producing a textured product, wherein the industrial fabric has a first layer, such as a woven base fabric, and a second layer, such as a film, that extends over at least a portion of a top surface of the first layer. The second layer has macro voids and micro voids. In certain embodiments, the macro voids impart a texture in a fiber product produced on the industrial fabric, whereas the micro voids limit or prevent penetration of the fibers of the product into the micro voids while at the same time increasing permeability of the industrial fabric.

27 Claims, 10 Drawing Sheets

(56) References Cited

U.S. PATENT DOCUMENTS

| | | | | | |
|---|---|---|---|---|---|
| 5,260,171 | A * | 11/1993 | Smurkoski | B29C 35/10 | 428/152 |
| 5,334,289 | A * | 8/1994 | Trokhan | B29C 39/18 | 162/902 |
| 5,679,222 | A * | 10/1997 | Rasch | B29C 43/222 | 162/900 |
| 2004/0126570 | A1 | 7/2004 | Kramer et al. | | |
| 2009/0078388 | A1 * | 3/2009 | Barrett | D21F 1/0045 | 162/348 |
| 2011/0265967 | A1 * | 11/2011 | Phan | D21F 11/006 | 162/289 |
| 2012/0021171 | A1 | 1/2012 | Riviere et al. | | |
| 2018/0119347 | A1 | 5/2018 | Brent, Jr. et al. | | |
| 2018/0119348 | A1 | 5/2018 | Brent, Jr. et al. | | |

FOREIGN PATENT DOCUMENTS

| | | | |
|---|---|---|---|
| JP | 2014-121693 | A | 7/2014 |
| JP | 2017-528619 | A | 9/2017 |
| JP | 2017-534772 | A | 11/2017 |
| WO | WO 2014/001217 | A1 | 1/2014 |

OTHER PUBLICATIONS

Liu, Jinxin et al.: "Low resistance bicomponent spunbond materials for fresh air filtration with ultra-high dust holding capacity", RSC Advances, 2017, 7, pp. 43879-43887.

International Search Report and Written Opinion prepared for International Application PCT/US2022/042146 by the European Patent Office acting as the International Searching Authority, mailed Dec. 20, 2022.

* cited by examiner

FIG. 1A
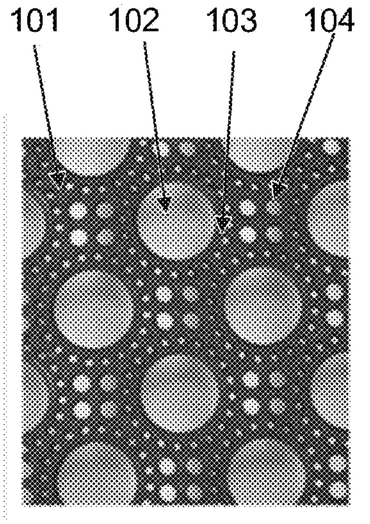
8 mm/2 mm/1 mm voids,
60.7% ECA, 38.6% CA,
643 CFM
FIG. 1B
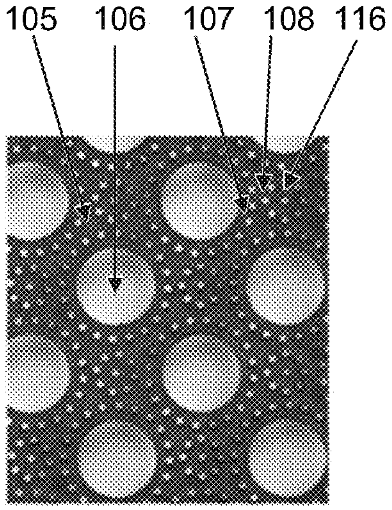
8 mm/1 mm voids,
60.7% ECA, 42.9% CA,
538 CFM
FIG. 1C
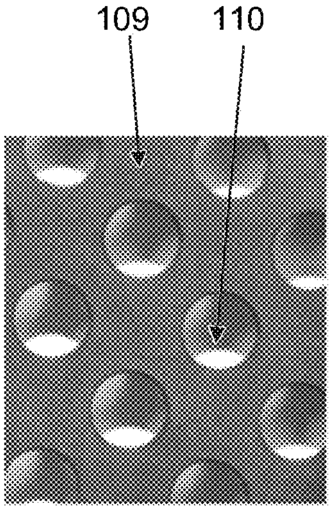
8 mm voids, 60.7% CA,
343 CFM
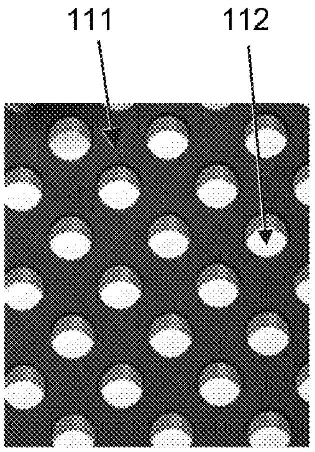
FIG. 1D
5 mm voids
60.7% CA
313 CFM FIG. 10
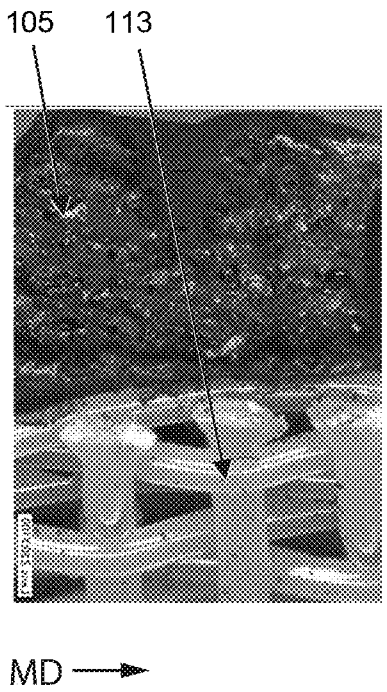
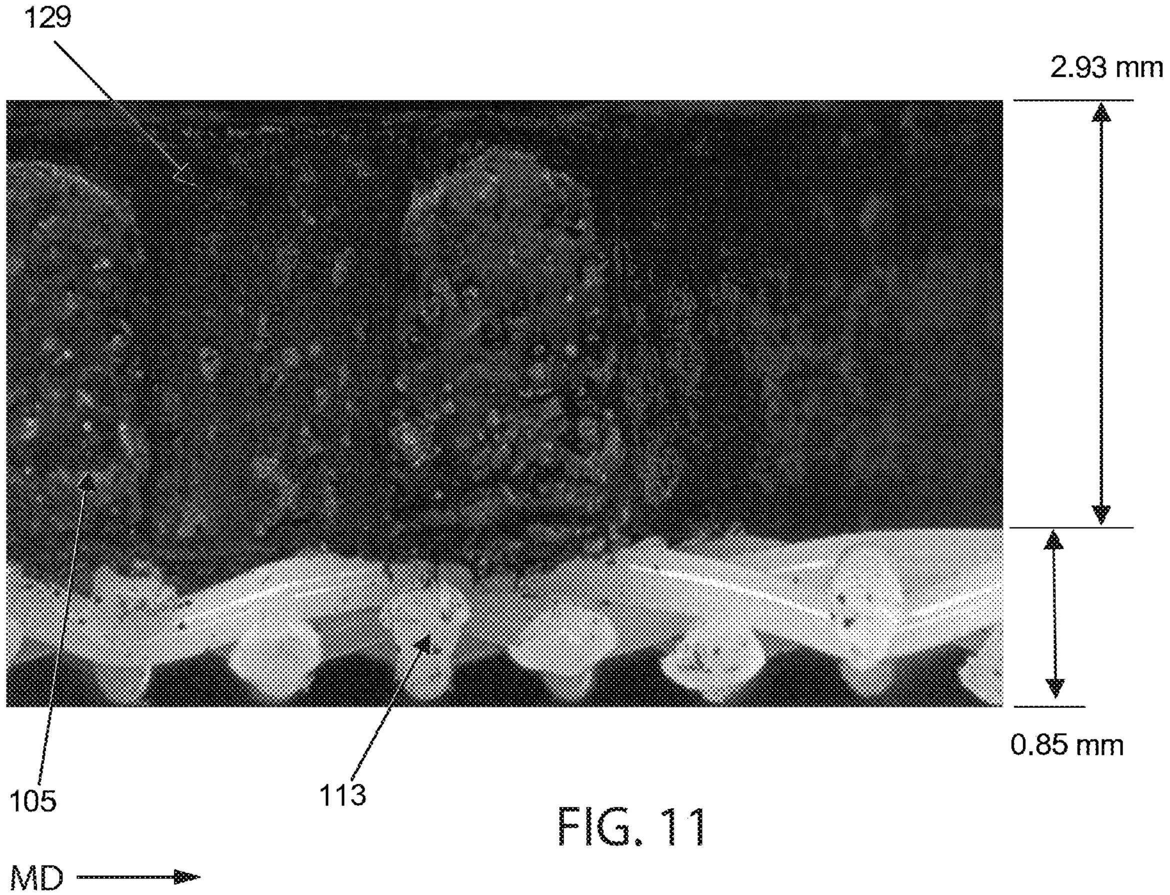
FIG. 11

HIGH PERMEABILITY TEXTURING BELT

CROSS-REFERENCE TO RELATED APPLICATION

This application claims the benefit of priority of U.S. Provisional Patent Application Ser. No. 63/240,542 filed Sep. 3, 2021. The foregoing application is incorporated herein by reference in its entirety.

FIELD OF THE INVENTION

The invention relates to an industrial fabric, such as a texturing belt, used to create three-dimensional structures in a product produced thereon in the papermaking field, such as for fiber products, and in nonwoven processes.

BACKGROUND

During the papermaking process, a fibrous web is formed by depositing a fibrous slurry, e.g., an aqueous dispersion of cellulose fibers, onto a moving forming fabric in the forming section of a paper machine. A large amount of water is drained from the slurry through the forming fabric, leaving the cellulosic fibrous web on the surface of the forming fabric.

The newly formed cellulosic fibrous web proceeds from the forming section to a press section, which includes a series of press nips. The cellulosic fibrous web passes through the press nips supported by a press fabric, or, as is often the case, between two such press fabrics. In the press nips, the cellulosic fibrous web is subjected to compressive forces that squeeze water therefrom, and which adhere the cellulosic fibers in the web to one another to turn the cellulosic fibrous web into a paper sheet. The water is accepted by the press fabric or fabrics and, ideally, does not return to the paper sheet.

The paper sheet finally proceeds to a dryer section, which includes at least one series of rotatable dryer drums or cylinders, which are internally heated by steam. The newly formed paper sheet is directed in a serpentine path sequentially around each in the series of drums by a dryer fabric, which holds the paper sheet closely against the surfaces of the drums. The heated drums reduce the water content of the paper sheet to a desirable level through evaporation.

It should be appreciated that the forming, press, and dryer fabrics all take the form of endless loops on the paper machine and function in the manner of conveyors. It should further be appreciated that paper manufacture is a continuous process that proceeds at considerable speeds. That is to say, the fibrous slurry is continuously deposited onto the forming fabric in the forming section, while a newly manufactured paper sheet is continuously wound onto rolls after it exits from the dryer section.

Woven fabrics take many different forms. For example, they may be woven endless, or flat woven and subsequently rendered into endless form with a seam. Alternatively, they may be produced by a process commonly known as modified endless weaving, wherein the widthwise edges of the base fabric are provided with seaming loops using the machine-direction (MD) yarns thereof. In this process, the MD yarns weave continuously back and forth between the widthwise edges of the fabric, at each edge turning back and forming a seaming loop. A base fabric produced in this fashion is placed into endless form during installation on a paper machine, and for this reason is referred to as an on-machine-seamable fabric. To place such a fabric into endless form, the two widthwise edges are seamed together. To facilitate seaming, many current fabrics have seaming loops on the crosswise edges of the two ends of the fabric. The seaming loops themselves are often formed by the MD yarns of the fabric. The seam is often formed by bringing the two ends of the press fabric together, by interdigitating the seaming loops at the two ends of the fabric, and by directing a so-called pin, or pintle, through the passage defined by the interdigitated seaming loops to lock the two ends of the fabric together.

Texturing belts in the papermaking field are used to make three-dimensional nonwoven and tissue and towel structures. Typically, these belts are employed in the forming sections of the papermaking process where an increase in caliper of the belting can directly impart caliper, bulk, and three-dimensional patterning in the textured products produced, such as rolled goods. For this type of texturing belt, there usually exists a base weave for, e.g., dimensional stability and load bearing properties. Often, these belts have a second layer top surface added to the base weave specifically to impart caliper, texture, pattern, and bulk. This top surface can be made from a thermoplastic or thermoset material and can be applied directly in a chemical form, or first produced as a sheet and then subsequently bonded to the base fabric's surface of the belt. Bonding can be chemical or thermal, or a combination thereof.

These belts, however, suffer several problems, including, e.g., the loss in permeability that occurs when a significant portion of the base weave of the belt is covered with a second material. Permeability is lost because the second material covers and blocks what otherwise are open areas of the base weave. The lower permeability of the belt results in less control of the sheet during formation as vacuums are used to pull fibers into the textured surface of the belt and to hold them in place prior to release.

One option to address the lower permeability, and its associated problems, is to slow down speeds of the belts to avoid turbulence and hold the sheet in place. Slowing down the speeds, however, has the negative effect of increased time of production. Other negative effects of slowing down the speeds of the belts include an increased cost of goods produced and less overall production capacity of the machine. A second option that has been practiced in the field of art is to increase vacuum levels. But that has the negative effect of, for example, resulting in more fiber loss into and through the belt.

SUMMARY OF THE INVENTION

The instant invention relates to an industrial fabric for producing a textured product. The industrial fabric comprises a first layer and a second layer. The second layer extends over at least a portion of a top surface of the first layer. The second layer comprises a plurality of macro voids and micro voids. The macro voids impart a texture into the product produced thereon. The micro voids limit fiber penetration of product fibers into the micro voids.

In certain embodiments, the micro voids increase permeability of the industrial fabric.

In other embodiments, the fibers of the textured product stretch and/or bend into the macro voids.

In some embodiments, the fibers of the textured product are selected from the group consisting of: spunbond fibers, chopped fibers, meltblown fibers, spunlace fibers, wet laid fibers, heat-bonded fibers, natural fibers, synthetic fibers, and combinations thereof.

In yet other embodiments, the second layer is a nonwoven layer.

In certain other embodiments, the second layer comprises a material selected from the group consisting of: engineered polymers, thermoplastics, thermoplastic polyurethane, elastomers, cross-linked plastics, rubbers, polyamides, polyesters, co-polyesters, EVA (ethylene-vinyl acetate), and combinations thereof.

In some embodiments, the first layer is a base fabric. In some other embodiments, the first layer is a base fabric selected from the group consisting of: woven fabrics, nonwovens, machine direction yarn arrays, cross-machine direction yarn arrays, braids, a series of independent rings, spiral linked, extruded meshes, and knitted structures.

In other embodiments, at least a portion of the macro and/or micro voids in the second layer are in a shape selected from the group consisting of: circular, elliptical, polygonal, and lobate.

In certain embodiments, the polygonal shape is selected from the group consisting of: triangular, rectangular, square, and trapezoidal.

In some embodiments, the second layer extends over the entire length and/or width of the first layer.

In other embodiments, the permeability of the industrial fabric is at least 300 CFM.

In yet other embodiments, the top surface of the first layer is a top surface of a forming side of a base fabric.

In certain embodiments, the second layer is laminated to the first layer.

In yet other embodiments, the second layer is a film.

In some embodiments, the first layer and the second layer are laminated together by using heat and pressure.

In yet other embodiments, the macro voids and micro voids are laser-created voids and/or drilled voids.

In certain embodiments, the second layer is a film, and the film comprises a compound selected from the group consisting of: engineered polymers, thermoplastics, thermoplastic polyurethane, elastomers, cross-linked plastics, rubbers, polyamides, polyesters, co-polyesters, EVA, and combinations thereof.

In other embodiments, the macro voids are a topographical feature of the second layer and are complementary to a desired texture in the textured product.

In some other embodiments, the macro voids have a diameter in the range of 6 mm to 12 mm. In yet other embodiments, the micro voids have a diameter in the range of 1 mm to 5 mm. In certain embodiments, the macro voids have a void volume in the range of 50 to 90 $mm^3$. In other embodiments, the micro voids have a void volume in the range of 20 to 50 $mm^3$.

In certain embodiments, there is a closed area in the industrial fabric of about 5% to about 95%.

In other embodiments, there is an effective closed area in the industrial fabric of about 5% to about 95%.

In some embodiments, the micro voids prevent substantial fiber penetration of the textured product into the micro voids.

In yet other certain embodiments, the textured product fibers bridge the micro voids.

In certain embodiments, the first layer of the industrial fabric is selected from a woven fabric and a nonwoven fabric.

In other embodiments, the first layer of the industrial fabric comprises a machine-side surface.

In some embodiments, the industrial fabric is a papermaking fabric. In certain embodiments, the industrial fabric is a texturing belt or a processing belt.

The present invention further concerns a method of making a textured product. The method comprises texturing a product with an industrial fabric, wherein the industrial fabric comprises a first layer, such as a base fabric, and a second layer, such as a film, extending over at least a portion of a top surface of the first layer. The second layer comprises a plurality of macro voids and micro voids. The macro voids impart a texture into the product produced thereon. The micro voids limit penetration of product fibers into the micro voids.

BRIEF DESCRIPTION OF THE DRAWINGS

FIGS. 1(A) and (B) illustrate a top-down view of a texturing film for use as a second layer on top of a first layer, such as a base fabric, in accordance with the present invention. The second layer is a perforated film for use on top of the base fabric surface. The film has macro and micro voids. FIG. 1(C) illustrates a top-down view of a conventional texturing film for use as a second layer on top of a first layer, such as a base fabric. The second layer is a perforated film for use on top of the base fabric surface. The film has only macro voids. FIG. 1(D) illustrates a top-down view of another conventional texturing film for use as a second layer on top of a first layer, such as a base fabric. The film has only macro voids.

FIG. 3 is used herein to refer to both FIGS. 3(A) and 3(B).

FIG. 4 illustrates yarns of the base fabric running in the MD with a width of 0.30 mm and yarns of the base fabric running in the cross-machine direction (CD) with a width of 0.33 mm.

FIG. 5 shows a cross-sectional diameter of this micro void ring pattern as 4.73 mm.

FIG. 10 illustrates an enlarged cross-sectional view of the belt of FIG. 8.

FIG. 11 illustrates an enlarged cross-sectional view of the belt of FIG. 8 with measurements of the woven base fabric as having a 0.85 mm thickness and of the laminated film as having a 2.93 mm thickness.

DETAILED DESCRIPTION OF THE INVENTION

Figure 2:
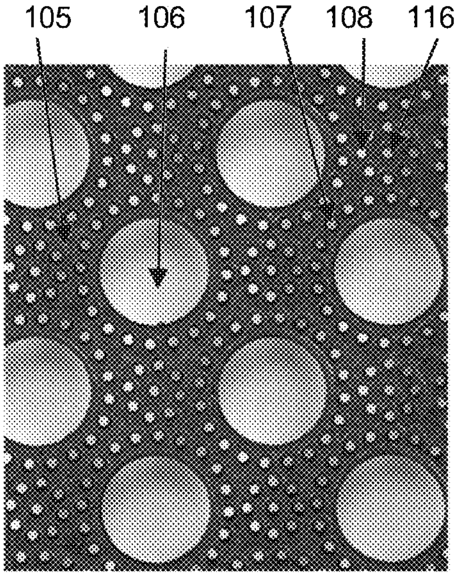
FIG. 2 illustrates an enlarged view of the film of FIG. 1(B).

The terms "comprising" and "comprises" in this disclosure can mean "including" and "includes" or can have the meaning commonly given to the term "comprising" or "comprises" in U.S. Patent Law. Terms "consisting essentially of" or "consists essentially of" if used in the claims have the meaning ascribed to them in U.S. Patent Law. Other aspects of the invention are described in or are obvious from (and within the ambit of the invention) the following disclosure.

The term "yarn" or "yarns" in the following disclosure can refer to monofilaments, multifilament yarns, twisted yarns, textured yarns, coated yarns, bicomponent yarns, as well as yarns made from stretch broken fibers of any materials known to those ordinarily skilled in the art. Yarns can be made of carbon, nylon, rayon, fiberglass, cotton, ceramic, aramid, polyester, metal, polyethylene glass, polyamide, polypropylene, and/or other materials that exhibit desired physical, thermal, chemical or other properties. Further examples of suitable compounds include, e.g., polycyclohexylenedimethylene terephthalate (PCT), cyclohexanedimethanol terephthalic acid (PCTA), polyphenylene sulfide (PPS), polyether ether ketone (PEEK), polyetherketoneketone (PEKK), and polyethylene naphthalate (PEN). Generally, any yarns of the first layer of an industrial fabric of the invention may be made from any commercially available material that is compatible, or can be made compatible, for bonding to the second (e.g., top) layer, which is a nonwoven.

The terms "void" or "voids" have their conventional and ordinary meaning. Accordingly, the terms can refer to, e.g., a hollow or empty space in an otherwise solid or semi-solid substance or an aperture or gap allowing a substance, e.g., air or water, to pass therethrough. The terms may also be understood as, but not limited by, descriptive terms such as a hole or cavity.

"Macro void" in the following disclosure means a void in a sheet-contact, or forming side, surface of a layer of material that is large enough to allow partial or total fiber entry into at least a portion of the void and that is larger than a "micro void."

"Micro void" in the following disclosure means a void in a sheet-contact, or forming side, surface of a layer of material that limits fiber penetration into the void. A "micro void" is smaller than a "macro void." A micro void typically prevents total, significant, or substantial fiber entry or penetration into the void area of the micro void. In some embodiments, a micro void may result in partial fiber entry or penetration into the void area of the micro void.

"Lamination," "laminating," "laminate," or "laminated" are used interchangeably in the following disclosure and have their conventional and ordinary meaning. Accordingly, the terms can refer to, e.g., firmly attaching two or more layers together by, e.g., using a resin and/or heat. The materials joined together can be the same or different materials. The lamination can be accomplished, e.g., by either layering a pre-formed layer atop a second layer, or by applying a viscous material atop a second layer and curing the viscous layer into a solid or semi-solid state.

"Closed Area" or "CA" as used in the following disclosure is that part or portion, e.g., of a second layer of an industrial fabric of the invention, such as a film, that does not have any macro or micro voids. For example, in a second layer that is a film, the "closed area" will be the solid area of the film.

"Effective Closed Area" or "ECA" as used in the following disclosure is that part or portion, e.g., of a second layer of an industrial fabric of the invention, such as a film, that does not comprise macro voids. The "effective closed area" thus refers to that part or portion that comprises a closed area and micro voids. For example, in a second layer that is a film, the "effective closed area" will be the film's solid area plus micro voids. The phrase "effective closed area" is used since the micro voids may increase the loft of a fiber product and improve sheet formation, but do not necessarily create a consistent defined pattern in the finished fiber product.

The terms "machine direction" (MD) and "cross-machine direction" (CD) as used in the following disclosure are used in accordance with their well-understood meaning in the art. That is, the MD of an industrial fabric, such as a belt, refers to the direction that the industrial fabric moves in a, e.g., tissue/towel or nonwovens making process, while CD refers to a direction perpendicular to the MD of the industrial fabric.

The term "air permeability" as used in the following disclosure is used in accordance with its well-understood meaning in the art. For example, the American Society for Testing and Materials ("ASTM") defines the term "air permeability" as the rate of air flow passing perpendicularly through a known area under a prescribed air pressure differential between the two surfaces of a material. It is generally expressed as $ft^3/min/ft^2$ for a pressure drop across the fabric of 0.5 in. of water or abbreviated as CFM ("cubic feet per minute").

The instant invention solves, among other things, the aforementioned problems associated with the loss of permeability in texturing belts having a layer of material that covers at least a portion of a base fabric of the belt. Specifically, the instant invention provides an industrial fabric, such as a belt, with a second layer, such as a film, attached to a first layer, such as a woven fabric, where the second layer has voids of varying size, namely, "macro" and "micro" voids. The "macro" voids impart the desired texture, pattern, and bulk to the textured product produced on the industrial fabric. The "micro" voids are typically small enough to prevent and avoid substantial fiber penetration into the micro voids while effectively maintaining the solid closed areas of the second layer (e.g., a film) that is over the first layer (e.g., a woven base fabric). Otherwise stated, the macro voids impart a texture into a fiber product produced on the industrial fabric, and the micro voids maximize fluid flow (e.g., air and/or water) through the industrial fabric while limiting the textured product's fiber loss (waste) in the production process. Fiber loss would be understood as fibers that are pulled entirely through the laminated belt structure and do not become a part of the final product, e.g., they are waste.

Typically, the micro voids limit the amount of texturizing in a fibrous product produced thereon. For example, in some embodiments, the micro voids do not impart any pattern in the fiber product. In other embodiments, the micro voids may impart a background pattern in the fiber product, but do not substantially interfere with the pattern imparted by the macro voids in the fiber product.

This "macro" and "micro" void combination thus allows for, and maintains, permeability of the industrial fabric (e.g., belt) without sacrificing the caliper, texture, pattern, and bulk of the textured fiber product. A belt of the invention does not suffer the negative effects of increased production times that occur when belt speeds are slowed down. A belt according to the instant invention allows for the retention of permeability while imparting a texture that allows the manufacture of products, e.g., rolled goods, to happen at the same processing speeds as was possible before the use of a texturing belt. Further, a belt according to the instant invention better maintains sheet hold down and sheet quality by way of, for example, increasing air flow or air permeability. A belt according to the instant invention has the advantage that areas of the belt closed to fiber penetration still allow for air (or water) permeation via the micro voids.

The industrial fabric of the invention is a fabric that has both a sheet-contact side, or forming side, and a machine side. A forming side is that which would be appreciated in the field of art as the top side of an industrial fabric, such as a belt, that contacts a sheet or web of fiber during a production process, while the machine side would be understood as the bottom side of an industrial fabric, such as a belt, that does not contact a sheet or web of fiber during the production process.

The industrial fabric of the invention comprises at least a first layer and a second layer. The second layer comprises a sheet-contact side, or forming side, surface that contacts a fiber-based product produced thereon. The first layer may also comprise a sheet-contact side, or forming side, surface that contacts the fiber-based product produced thereon. In some embodiments, the first layer additionally comprises a machine-side surface. In other embodiments, the industrial fabric comprises more than two layers, e.g., a third or more layers. In certain embodiments, a batting layer can be further attached to the forming or machine side of the first layer. The batting layer can be made of, e.g., fine nonwoven fibrous material.

The instant invention concerns an industrial fabric, such as a belt, for producing a textured product, such as a textured nonwoven product. In certain embodiments, the textured nonwoven product is made from natural or synthetic fibers, or some combination of both.

In certain embodiments, the instant invention concerns an industrial fabric, such as a belt, that has a base fabric with a forming side and a machine side. The base fabric further has a layer of material that extends over at least a portion of the forming side. The base fabric constitutes a first layer of the belt, and the layer of material extending over at least a portion of the forming side of the base fabric constitutes a second layer of the belt, which can be a laminated layer. This second layer has both macro voids and micro voids. The macro voids are a topographical feature of the second layer and are, e.g., complementary to a desired texture of a fiber-based product produced thereon. The micro voids can, e.g., prevent fiber penetration into and through the first layer that is a base fabric. The micro void can be small enough to prevent product fibers from passing through the second layer to the first layer in relation to the fiber type, e.g., nonwovens, paper, glass, synthetic, non-synthetic, and/or metallic fibers.

The instant invention is advantageous at least because it is a solution to the loss of permeability in texturing belts where the topmost surface layer (e.g., topmost forming or sheet-contact side surface of the belt) only has macro voids. For example, the invention allows, among other benefits, for the retention of permeability in a texturing belt, while imparting a texture into a product produced on the belt and allowing a rolled good manufacturing to operate at the same processing speeds as was possible before the use of a texturing belt in the prior art.

For example, in spunbond nonwovens production, air suction has an effect on the fiber structure of a product because air suction drives the fibers into the macro voids of the fabric. A person of ordinary skill in the art would appreciate that in spunbond nonwovens, fibers are continuously spun for each production order or merge (switching from producing one nonwoven product to producing a different nonwoven product). For example, in processing spunbond nonwovens, spunbond fibers are quenched in chilled air in a quenching chamber and then (or simultaneously) attenuated as they exit the chamber and land on the texturing belt (which can also be referred to by a person of ordinary skill in the art as a spin belt) in the form of a web. The distribution of the macro voids can increase the fiber density in the voids, while, as a general matter, fiber density is not affected by vacuum air suction speed. In certain embodiments, the vacuum simply removes the incoming attenuation air supply. That is, a person of ordinary skill in the art would appreciate that the vacuum's main function in this embodiment is removing the incoming air. The volume of air leaving attenuation and exiting through the vacuum is typically designed to be (ideally) equal, and the orifices in the belt can control local velocity, thereby creating density differences in the sheet. Large diameter voids in the fabric can create highly localized flows that accumulate more fiber during vacuum suctioning. Where there is no void, fiber density is lowest. While smaller voids accumulate less fiber, air permeability in these regions allows for less of a gradient in density between micro voids, thereby improving, e.g., the overall machine direction (MD) and cross-machine direction (CD) tensile strength of the sheet produced. Accordingly, an overall permeability that is typically needed to remove all of the attenuation air and, at the same time, keep the fiber product sheet on the surface of the fabric with acceptable tensile properties is in the permeability range of 400-700 CFM. Too low of a permeability creates an overflow of attenuation area that disrupts the sheet and requires higher suction velocities, causing the structure of the fiber product to become more compact/less pronounced, and weaker due to density gradients, during manufacturing and subsequent post processing. Higher initial permeability allows for a reduction in suction values that results in more loft in the final structure of the fiber product.

Thus, generally, the permeability requirements of an industrial fabric, such as a belt, that handles fiber products through manufacturing would be appreciated as typically approximately 400-700 CFM.

In certain embodiments, the instant invention relates to an industrial fabric, such as a belt, for creating a three-dimensional structure in paper, tissue, towel, and/or nonwoven processes. In some embodiments, a laser, or other mechanism, is used to create voids of different sizes and/or diameters in a second layer, e.g., a film, that extends, partially or wholly, over a first layer that is a base fabric. In certain embodiments, the voids created are macro voids and micro voids.

Macro voids in a second layer (e.g., a film) on top of a first layer (e.g., a base fabric) may impart a desired texture, pattern, and/or bulk to a fiber product while micro voids are distributed in the second layer to avoid fiber penetration and effectively maintain the solid closed areas of the second layer on top of the first layer while enhancing permeability. By way of example, in spunbond nonwovens production, the macro voids are large enough in diameter so that when a spunbond fiber is laid down on a belt of the invention, and with the assistance of air suction of, e.g., a vacuum, the fibers bend and stretch in the macro voids. In some embodiments, the fibers bend and stretch in the macro voids such that they collectively assume, or take on the form of, the macro voids. The fibers are pulled down into the macro void by the air suction. In contrast, when the spunbond fibers are laid upon that portion of the belt having the micro voids, the void diameter is such that the fibers "bridge" the gap and are not pulled down into the micro void by, e.g., a vacuum. By way of further example, alternate production of nonwovens may include the use of chopped fibers. An ordinarily skilled artisan would appreciate that these chopped fibers may also have a long length that similarly would bend or stretch with the assistance of air suction and take on the shape of, or fill, a macro void, while the chopped fibers would bridge the gap of a micro void.

The exact size, including the diameter, of the macro voids and micro voids, can be varied and can be related to the fiber diameter and fiber length being used to create the fiber-based product on the industrial fabric. The diameter of the macro voids and micro voids can also vary from the top of the void to the bottom of the void, e.g., having a conical-like shape. Typically, the macro voids may impart a texture by, e.g., allowing fiber penetration into the macro void, while micro voids allow no or limited/minimal fiber penetration that nonetheless enhances permeability of the industrial fabric and imparts little to no texture in the fiber product produced thereon.

The depth of the macro voids and micro voids can be varied and is related to the depth of the second layer (e.g., film) on top of the first layer (e.g., base fabric) in the industrial fabric. The macro and micro voids typically penetrate the entire second layer, e.g., layer of film, such that the first layer beneath the film, e.g., a woven fabric, is exposed, e.g., can be seen when viewed from the top surface of the industrial fabric.

The pattern of the macro voids and micro voids can be any desired pattern. The pattern can contain any combination of shapes. Shapes include, but are not limited to, circles, lines, dots, waves, slits, drawings, logos, trademarks, or any random or ordered pattern desired. In certain embodiments, the macro voids and/or micro voids can have a lattice pattern or arrangement. In other embodiments, the macro voids and/or micro voids can have no pattern but can be wholly randomly situated or arranged in the second layer of the industrial fabric.

The macro voids can vary in diameter, area, and/or void volume and do not have to have the same value throughout a singular industrial fabric, such as a belt. Similarly, the micro voids can vary in diameter, area, and/or void volume and do not have to have the same value throughout the fabric. For example, one macro void may be 8 mm in diameter while another macro void is 9 mm in diameter in a singular belt. Likewise, in this same belt, one micro void may be 2 mm in diameter while another micro void is 3 mm in diameter. Additionally, variation in the individual micro void diameter measurements can be a result of, for example, manufacturing techniques.

In certain embodiments, the micro void structure does not interfere with or alter the textural features imparted in a product by the macro void. In yet other embodiments, the micro void structure is large enough to permit fluid flow (e.g., air and/or water) from the second layer through to the first layer in the industrial fabric. And in other embodiments, the micro void structure is small enough to prevent fibers from passing from the second layer through to the first layer, e.g., depending upon the fiber type, such as nonwovens, paper, or glass. In certain embodiments, the micro voids impart loft to a fiber product produced thereon.

The first layer in the industrial fabric may be woven or nonwoven. In embodiments where the first layer is a woven fabric, the woven fabric can be woven in various weave patterns, such as complex or simple, single or multi-layered, for example, a plain weave pattern or a satin weave pattern. The woven fabric may be woven from monofilament, plied monofilament, multifilament or plied multifilament yarns, and may be single-layered, multi-layered or laminated. Yarns for the woven fabric may be extruded from any one of several synthetic polymeric resins, such as polyamide and polyester resins, used for this purpose by those of ordinary skill in the machine clothing arts.

In other embodiments, the first layer in the industrial fabric is a permeable nonwoven. In particular embodiments, the nonwoven is selected from extruded meshes, knitted structures, MD and/or CD yarn arrays, braids, a series of independent rings, or other nonwoven products such as foils, films, or spunbonds, carded, airlaid, melt blown or wetlaid.

In certain embodiments of the instant invention, applied to the industrial fabric's first layer, e.g., a woven base fabric, is a second layer that is a sheet, or forming side, layer of material. In some embodiments, this second layer is applied to the first layer through use of an adhesive, thread, screws, resin, or other physical, chemical, or thermal bonding techniques, or a combination thereof.

In certain embodiments, the industrial fabric's second layer is a polymeric layer that is applied to the first layer. For example, the second layer can be applied or connected, e.g., through chemical, or mechanical means, to the forming side of the first layer (e.g., forming side of a base fabric) as, e.g., a polymeric layer. The second layer could also be applied to the forming side of the first layer as a laminated film-like sheet or laminated film layer. Examples of materials that may be used for the second layer of material applied to the forming side of the first layer include thermoplastic materials. These thermoplastic materials can be laminated to the first layer (e.g., base fabric) in its entirety, or to select portions or regions of the first layer. For example, a laminated film layer may be applied to only half of the forming side of a first layer that is a base fabric, if so desired. In some embodiments, the second layer is laminated to the first layer by using heat and/or pressure.

In other embodiments, the second layer of the industrial fabric is first formed as a film-like sheet or a film layer prior to being laminated to the first layer of the industrial fabric.

In certain embodiments, the second layer of the industrial fabric is a film and is attached to the first layer, such as a base fabric, through use of an adhesive, thread, screws, resin, or other physical, chemical, or thermal bonding techniques, or a combination thereof. In certain embodiments, a portion, or all, of the film can impregnate a portion or all of the base fabric. In certain embodiments, the film forms a substantially planar surface on the forming (top) side of the industrial belt in the film regions that lack any macro or micro voids.

Any suitable material may be used in the formation of the industrial fabric's second layer, such as a film, on the first layer, such as a base fabric. Examples of suitable materials that the second layer may comprise include, e.g., PET (Polyethylene Terephthalate), EVA (Ethylene-Vinyl Acetate), PE (Polyethylene), Polypropylene (PP), or PU (Polyurethane), polyamides, polyesters, co-polyesters, thermoplastics, thermoplastic polyurethane, elastomers, cross-linked plastics, rubbers, and other engineered polymers.

In certain embodiments, the macro and micro voids in the industrial fabric's second layer form a circular shape. However, the macro and micro voids can be any and all shapes and/or sizes or mixtures. For example, a macro and/or micro void can be in the shape of a circle, square, needle, rectangle, oval, MD or CD oriented icon, slit, non-polygon, triangle, ellipse, polygon, trapezoid, and/or lobate. Additionally, the shape of the macro and/or micro void can vary through the second layer from the top surface area of the second layer to the bottom surface area of the second layer. For example, a void may have a circular shape at the top surface area of the second layer, but change or alter configuration through the second layer to become an oval shape at the bottom surface area of the second layer.

Additionally, macro and micro voids can be a multiple of sizes and/or shapes in the second layer, e.g., a laminated film layer, in the industrial fabric. That is, some macro and/or micro voids may have a circular shape in a laminated film layer while other voids in the layer may have a triangular shape, and yet other voids a lobate shape. Additionally, macro and/or micro voids might all be the same shape, e.g., a circular shape, but vary in size, e.g., one or more circular macro voids having a 4 mm diameter, one or more circular macro voids having an 8 mm diameter, and still one or more circular macro voids having a 12 mm diameter. In other embodiments, a second layer may have a macro void of, e.g., 12 mm and a micro void of 9 mm when fibers of 11 mm are used to produce a product thereon.

The invention encompasses industrial fabrics for the production of a textured fiber product, where the industrial fabric has at least a first layer and a second layer, and where the second layer is a top surface of the industrial fabric and comprises voids in at least two different sizes, in which a micro void (i) has an open area less than a macro void, (ii) does not alter the textural features imparted into a product by a macro void, (iii) is large enough to permit fluid flow (e.g., air and/or water) from the second layer to the first layer, and/or (iv) is small enough to prevent product fibers from passing through the second layer to the first layer in relation to the fiber type, e.g., nonwovens, paper, glass, synthetic, non-synthetic, and/or metallic fibers.

In some embodiments, the nonwoven second layer of the industrial fabric is impenetrable to air and/or water except for the macro and micro voids. In some embodiments, the nonwoven second layer penetrates or is intermixed with at least a portion of the industrial fabric's first layer, which may be a base fabric. In other embodiments, the nonwoven second layer does not penetrate or intermix with any portion of the first layer.

In certain embodiments, the shape of the macro and/or micro voids is such that it is variable and relative to end product design considerations (e.g., a desired pattern in a paper towel product produced on an industrial fabric of the invention) and/or the fiber diameter and/or fiber length utilized in the various forming processes for making a fiber-based product. By way of example, the size and/or the distribution of the macro voids can be selected based upon a particular design preference for a fiber product, for example, a specific texture for a toilet paper or diaper wipe, while the micro voids are distributed to improve air flow through a belt of the invention as the product is formed on the belt. A person of ordinary skill in the art would appreciate that micro voids are related to the overall macro void structure such that the characteristics of the micro voids, e.g., size and/or distribution, may be determined in a manner to induce equivalent air flows in the closed areas of an industrial fabric of the invention. By way of further example, in a belt of the invention, a macro void will be sufficient in size to allow a fiber to penetrate, while simultaneously, a micro void in the belt will have a size that prevents fiber penetration. In one example, a fiber-based nonwoven product may be made from fibers having a length of 4 mm. A macro void may be 8 mm in diameter while a micro void is 3 mm in diameter, thus allowing for fiber penetration into the macro void while simultaneously preventing fiber penetration into the micro void. The placement of the micro and macro voids in the second layer of the belt can be randomized or patterned, or some combination thereof.

The macro and micro voids in the second layer of an industrial fabric of the invention can be formed or made through any suitable means, such as through the use of lasers, drilling, or other chemical or mechanical means such as, for example, mechanical punching, embossing, molding, or any other suitable means that can perforate the material comprising the second layer. The use of lasers, drilling, or other chemical or mechanical means to create the macro and micro voids can occur at different stages in production of the industrial fabric. For example, a second layer that is a film may be produced and then lasers used to perforate the film. After the film has been perforated, the film may then be laminated to the first layer, e.g., a woven base fabric. Or, a film may be produced and then laminated to the base fabric. After lamination, lasers or other means may be used to perforate the film.

The perforations in the second layer of an industrial fabric of the invention allow for permeability of, e.g., air. For example, during the forming region of producing a textured product where a wet pulp of fibers forms a web on a belt of the invention, vacuum suction may be used. In these embodiments, the perforations in the second layer can allow the air from the vacuum to go through at least a portion of the micro voids, and thus increase overall belt permeability and web or sheet hold-down.

For a better understanding of the invention, its advantages and objects attained by its uses, reference is made to the accompanying descriptive matter in which non-limiting embodiments of the invention are illustrated in the accompanying drawings and in which corresponding components are identified by the same reference numerals. A person of ordinary skill in the art would appreciate that industrial fabric design and permeability are important as there must be an allowance for air removal while providing support, control, and texture to a fiber-based product being produced on the industrial fabric.

As explained in greater detail below, FIGS. 1A-1D provide an example and comparison between an embodiment of the invention (FIGS. 1A and 1B) and examples of the prior art (FIGS. 1C and 1D).

FIG. 1A illustrates a top-down view of a film (101) for use as a second layer in an industrial fabric (e.g., a belt) for producing a textured product according to the instant invention. In this illustration, thermoplastic film (101) was formed by extrusion. After the film (101) was made, a laser was employed to perforate the film (101) with macro (102) and micro (103, 104) voids. The laser perforated the film (101) with both circular-shaped macro (102) and circular-shaped micro (103, 104) voids. The laser perforated the film (101) with a particularized pattern. For example, macro voids (102) of 8 mm in diameter were created with a ring of 1 mm diameter micro voids (103) encircling each macro void. Placed between four neighboring rings of 1 mm diameter micro voids (103) is a square-shaped pattern of four 2 mm diameter micro voids (104).

The perforated film (an exemplary second layer) (101) was laminated to a woven base fabric (an exemplary first layer). The film of FIG. 1A (i.e., only the film) has a CFM of 1170. The base fabric to which the film (101) of FIG. 1A was laminated (i.e., only the base fabric) has a CFM of 916. The perforated film in FIG. 1A has an ECA (the film's closed area plus micro voids) of approximately 60.7% and a CA (the film's solid area only) of approximately 38.6%. The finished belt, i.e., the film and woven base fabric, has a CFM of 643. The air permeability, CFM, value was determined by a TexTest model FX 3360 PortAir Portable Air Permeability and Thickness Tester.

FIG. 1B illustrates a top-down view of a film (105) for use as a second layer in an industrial fabric (e.g., a belt) for producing a textured product according to the instant invention. In this embodiment, the laser perforated the film (an exemplary second layer) with both circular-shaped macro (106) and circular-shaped micro voids (107, 108). The laser perforated the film (105) with a particularized pattern. For example, macro voids (106) of 8 mm in diameter were created with a ring of 1 mm micro voids (107) fully encircling each macro void. Perforated between four neighboring rings of 1 mm micro voids is a ring pattern of eight 1 mm micro voids (108) with one singular 1 mm micro void (116) centered within that ring pattern of eight 1 mm micro voids (108). The perforated film has an ECA of approximately 60.7% and a CA of approximately 42.9%. The perforated film of FIG. 1B (i.e., only the film) has a 948 CFM. The base fabric (an exemplary first layer) to which the film was laminated (i.e., only the base fabric) has a 916 CFM. The finished belt, i.e., the film and base fabric, has a 538 CFM.

FIG. 1C illustrates a top-down view of a film (109) without micro voids for use in producing a textured product. The laser perforated the film (109) with circular-shaped macro voids (110). The laser perforated the film with a particularized pattern. For example, macro voids of 8 mm in diameter were created. The film of FIG. 1C has a CA of approximately 60.7%. The finished belt, i.e., the film and base fabric, has a 343 CFM.

FIG. 1D illustrates a top-down view of a film (111) without micro voids for use in producing a textured product. The laser perforated the film (111) with circular-shaped macro voids (112). The laser perforated the film with a particularized pattern. For example, macro voids of 5 mm in diameter were created. The film of FIG. 1D has a CA of approximately 60.7%. The finished belt, i.e., the film and base fabric, has a 313 CFM.

FIGS. 1A and 1B illustrate designs of a film for use in a texturing belt made according to the invention by way of comparative example with FIGS. 1C and 1D. That is, each of the belts made with films according to FIGS. 1A and 1B were compared against a conventionally made belt made with films represented by FIGS. 1C and 1D. The comparative CFM values show that the effect of adding micro voids in addition to the macro voids in the film as per the instant invention increased permeability by approximately 300 CFM (FIG. 1A) and approximately 200 CFM (FIG. 1B) as compared to a conventional belt represented by film and finished belt values in FIG. 1C. FIG. 1D further illustrates a comparative example wherein the CFM values show that the effect of adding micro voids in addition to the macro voids in the film as per the instant invention increased permeability by approximately 300 CFM (FIG. 1A) and approximately 200 CFM (FIG. 1B) as compared to a conventional belt represented by film and finished belt values in FIG. 1D.

FIG. 2 illustrates an enlarged view of the film of FIG. 1B.

Figure 3A:
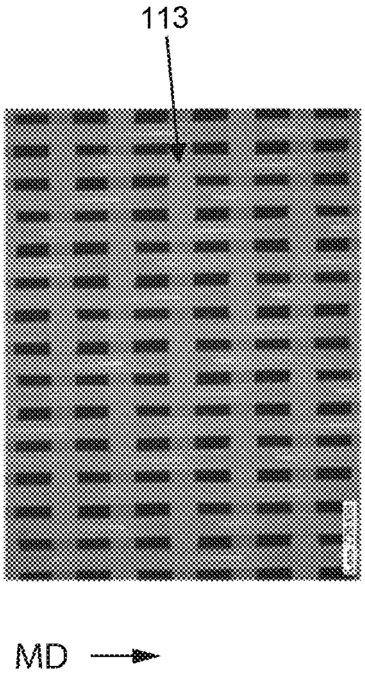
FIG. 3(A) illustrates a top-down view of a woven base fabric for use as a first layer.
Figure 3B:
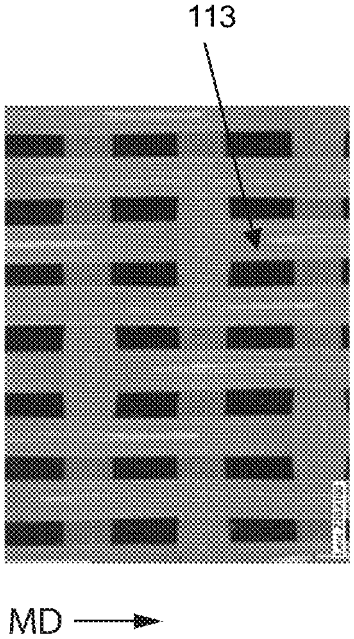
FIG. 3(B) illustrates an enlarged view of the woven base fabric of FIG. 3(A).

FIGS. 3A and 3B illustrate a woven base fabric (113) (an Albany International Corp. Prolux N005 fabric). FIG. 3B shows an enlarged portion of the base fabric (113) in FIG. 3A. The base fabric has an 875 CFM target. A target CFM can be based upon a desired target CFM when, e.g., factors such as a particular design, yarn diameters, weave pattern, and/or heat setting conditions are taken into account. A target CFM can also be based upon knowledge of previous manufacturing and measurements.

FIGS. 4-12 illustrate different measurements of the perforated film (an exemplary second layer) of FIG. 2 as laminated to the base fabric (an exemplary first layer) of FIG. 3.

Figure 4:
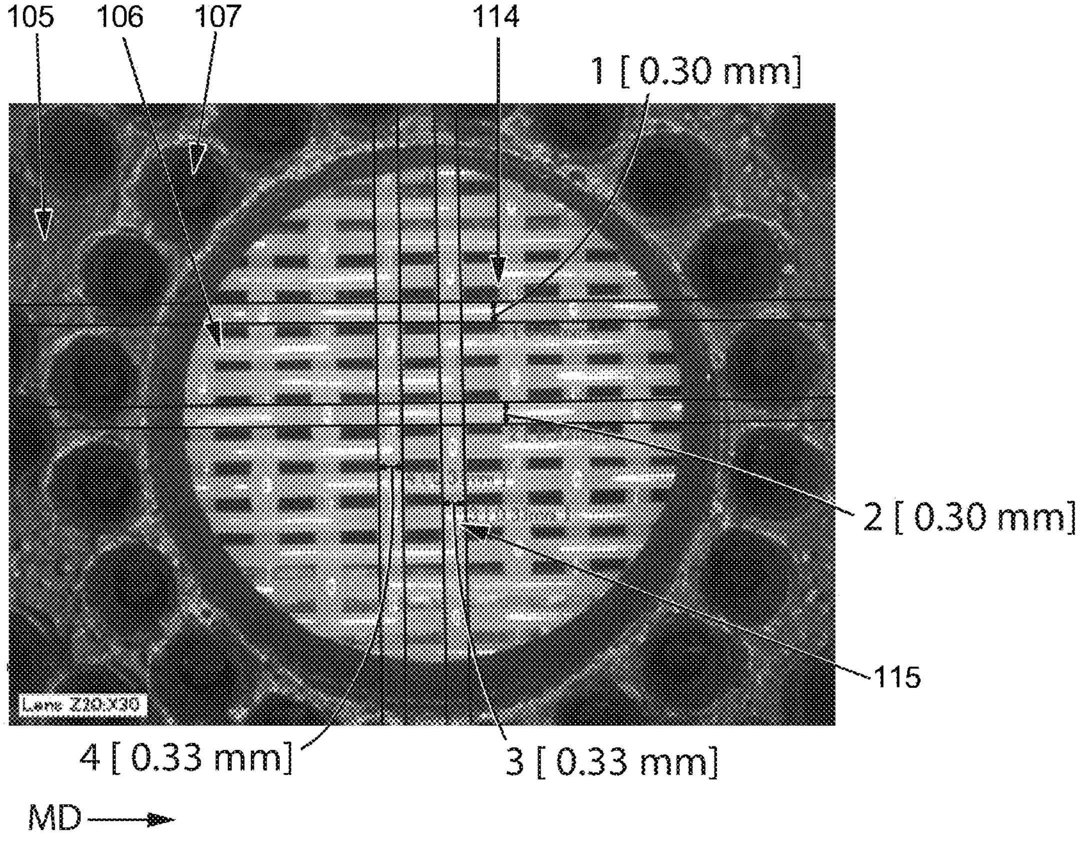
FIG. 4 illustrates the film of FIG. 2 laminated atop the base fabric of FIG. 3.

More particularly, FIG. 4 is a top-down view showing yarns of the base fabric running in the MD and CD and having a nominal diameter of 0.30 mm. For example, yarns of the base fabric running in the MD direction (114) are shown having a diameter of 0.30 mm. FIG. 4 shows yarns of the base fabric running in the CD direction (115) having a diameter of 0.33 mm. The base fabric (FIG. 3) is viewable from this top-down view through a macro void in the laminated film of FIG. 2.

Figure 5:
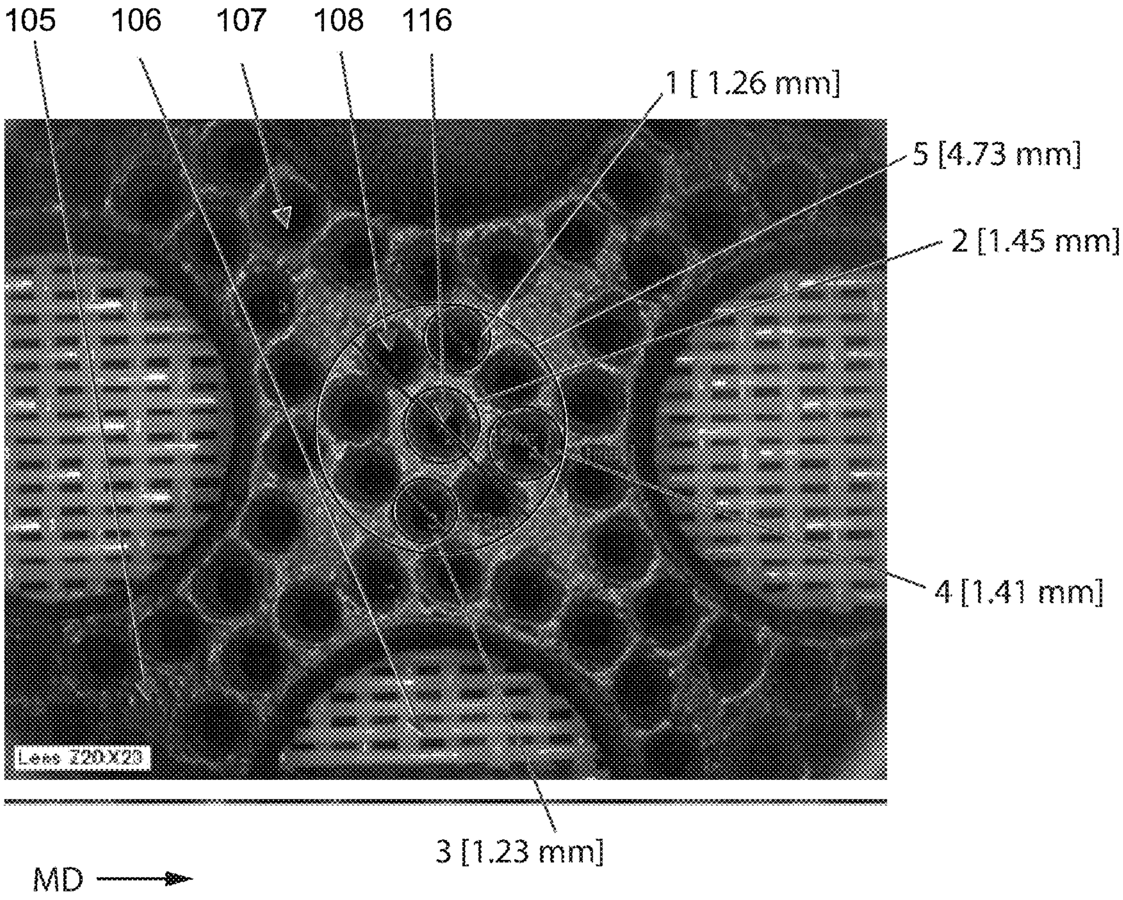
FIG. 5 illustrates the film of FIG. 2 laminated atop the base fabric of FIG. 3 with a micro void ring pattern. A first micro void has a diameter of 1.26 mm, a second micro void has a diameter of 1.45 mm, a third micro void has a diameter of 1.23 mm, and a fourth micro void has a diameter of 1.41 mm.

FIG. 5 is a top-down view showing measurements of eight micro voids (108) that form a ring in the laminated film of FIG. 2. Interior to that ring is a singular micro void (116). This micro void pattern (of a ring of micro voids with a micro void interior to that ring) is placed between four macro voids. A first micro void has a diameter of 1.26 mm. A second micro void has a diameter of 1.45 mm. A third micro void has a diameter of 1.23 mm. A fourth micro void has a diameter of 1.41. The diameter of this micro void ring pattern is 4.73 mm. The base fabric of FIG. 3 can be seen through the macro voids in this figure.

Figure 6:
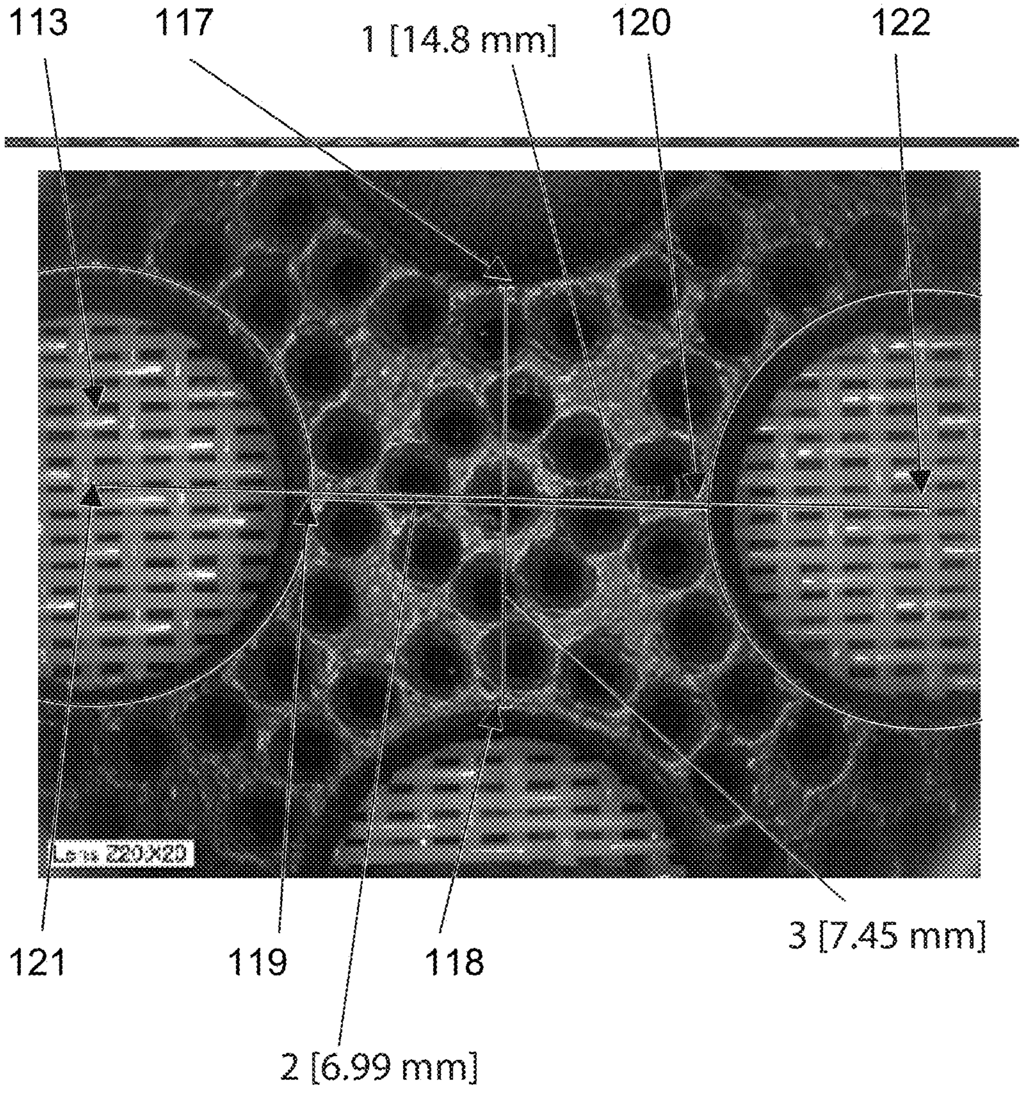
FIG. 6 illustrates the film of FIG. 2 laminated atop the base fabric of FIG. 3 with measurements of 7.48 mm between a first macro void and a second macro void in the cross-machine direction. In the machine direction, there is a distance of 6.99 mm between a first macro void and a second macro void. Measuring from the interior center of a first macro void to the interior center of a second macro void, the measurement is 14.81 mm.

FIG. 6 is a top-down view showing measurements of the spacing between the macro voids in the laminated film of FIG. 2. Here, in the cross-machine direction, the distance between a first macro void (117) and a second macro void (118) is 7.48 mm. In the machine direction, the distance between a first macro void (119) and a second macro void (120) is 6.99 mm. Measuring from the interior center of a first macro void (121) to the interior center of a second macro void (122), the measurement is 14.81 mm. The base fabric (113) of FIG. 3 can be seen through the macro voids in this figure.

Figure 7:
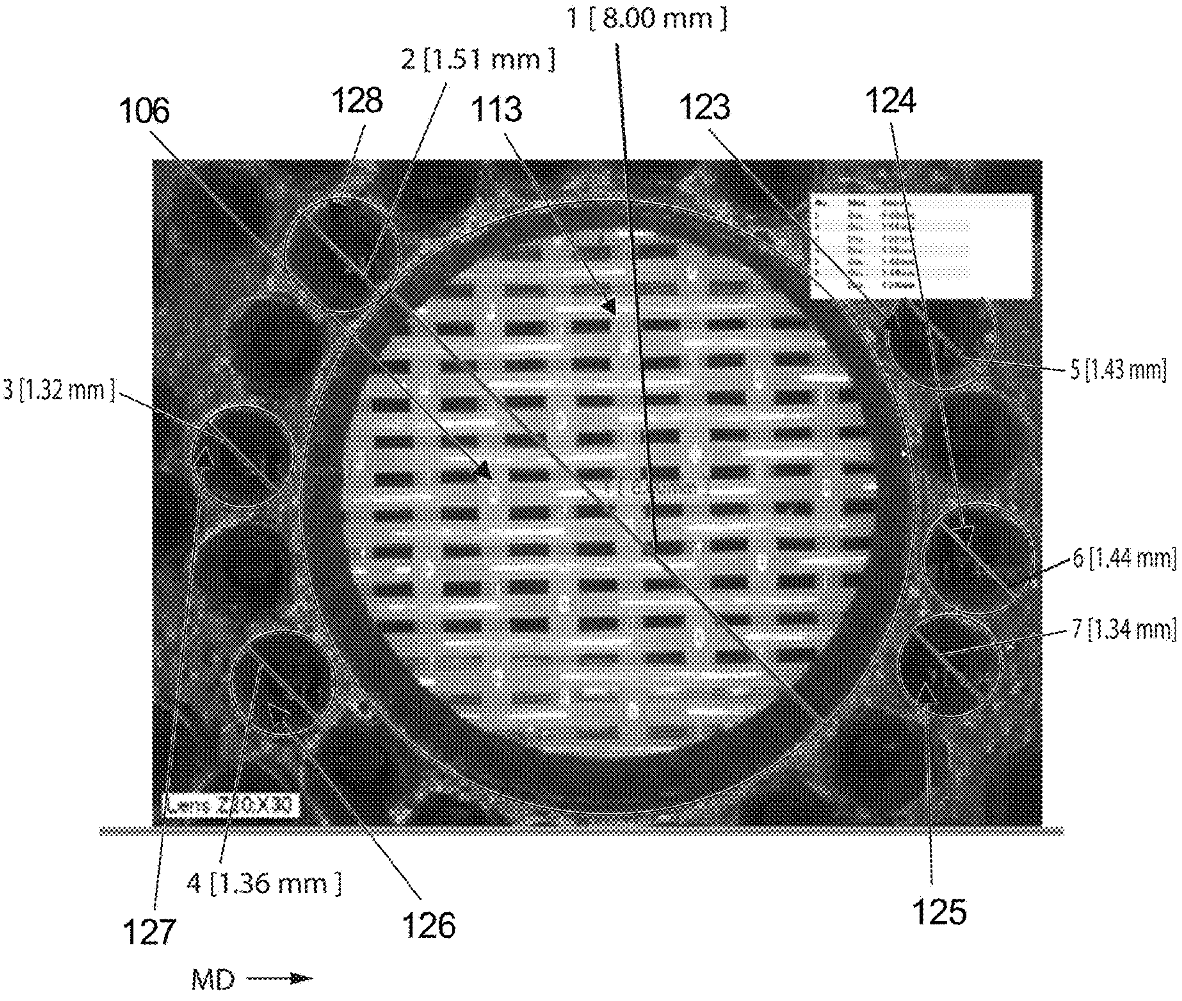
FIG. 7 illustrates the film of FIG. 2 laminated atop the base fabric of FIG. 3 with micro voids encircling a single macro void in the laminated film of FIG. 2. The nominal diameter of the micro voids in FIG. 2 is 1.40 mm. The diameter of the macro void is 8.00 mm.

FIG. 7 is a top-down view of the measurements of micro voids encircling a single macro void in the laminated film of FIG. 2. This figure also shows the diameter of the macro void (106) that is encircled by micro voids. To note, the base fabric (113) of FIG. 3 can be seen through the macro void in this figure. Here, a first micro void (123) is 1.43 mm in diameter. A second micro void (124) is 1.44 mm in diameter. A third micro void (125) is 1.34 mm in diameter. A fourth micro void (126) is 1.36 mm in diameter. A fifth micro void (127) is 1.32 mm in diameter. A sixth micro void (128) is 1.51 mm in diameter. In this embodiment, the target or nominal micro void diameter is 1.40 mm. The diameter of the macro void (106) interior to the encircling ring of eight micro voids is 8.00 mm.

Figure 8:
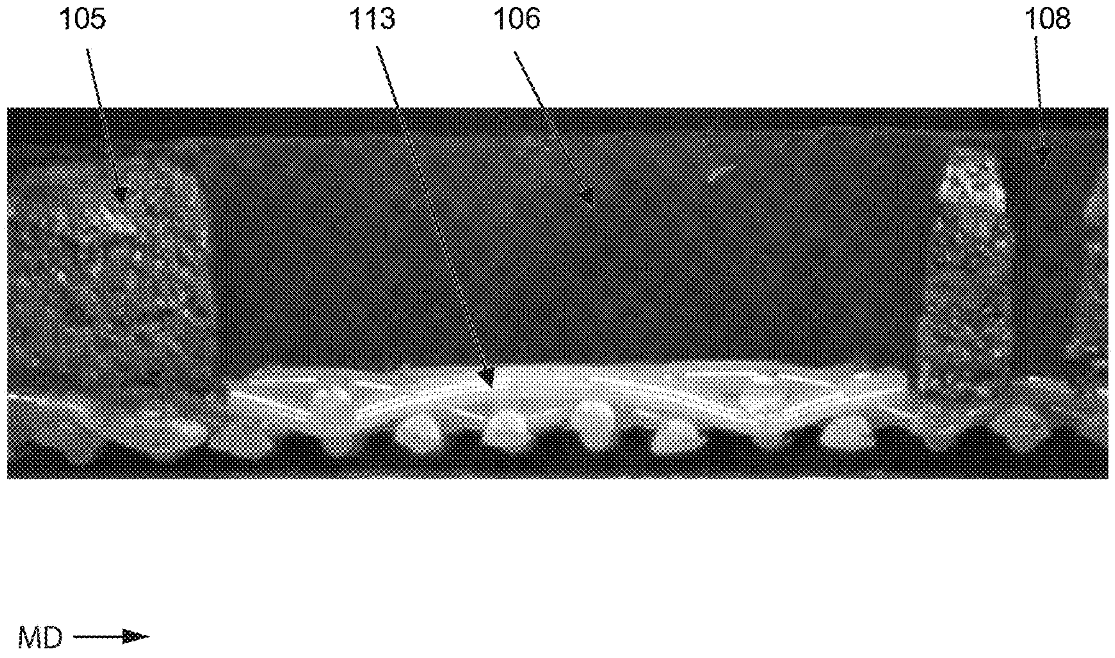
FIG. 8 illustrates a cross-sectional view of a belt of the invention where the film of FIG. 2 is laminated atop the base fabric of FIG. 3.

FIG. 8 shows a cross-sectional view of the film (105) of FIG. 2 having macro void (106) and micro void (108) and laminated to the top of the woven base (113) fabric of FIG.

Figure 9:
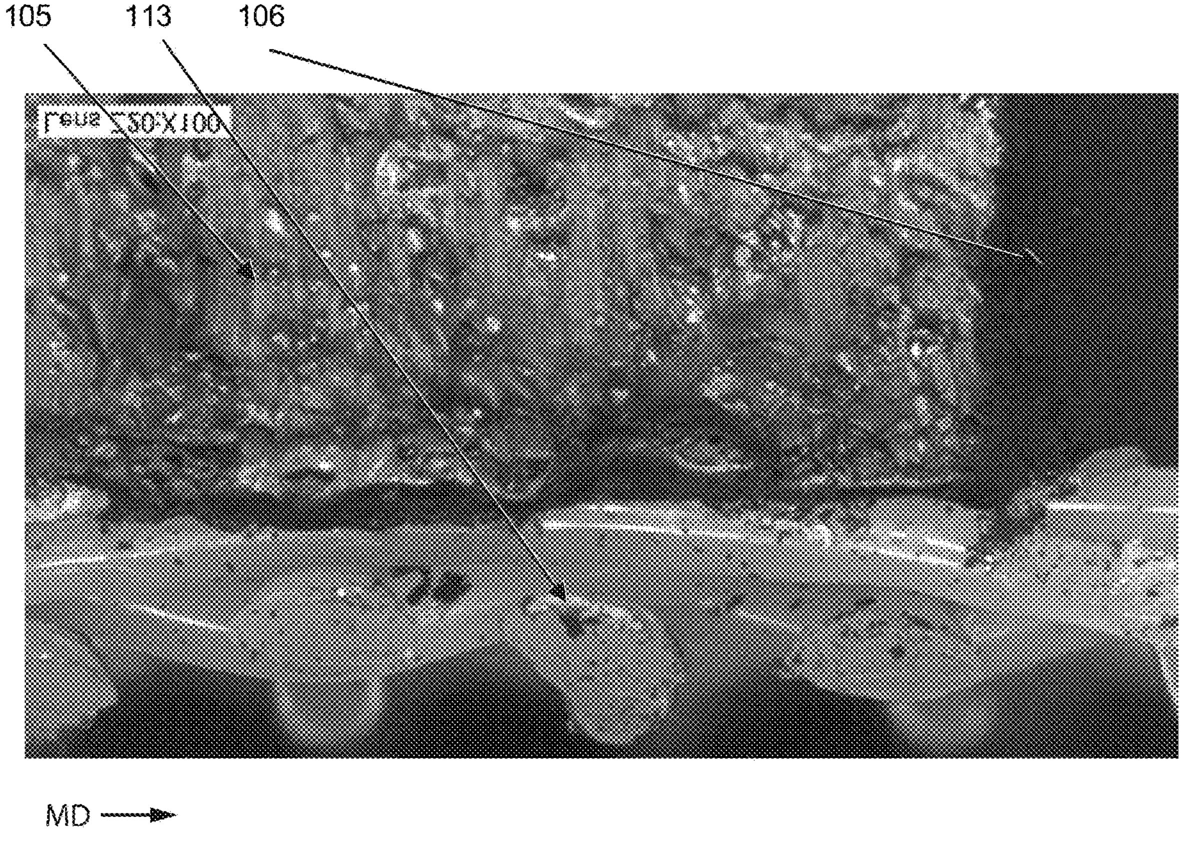
FIG. 9 illustrates an enlarged cross-sectional view of the belt of FIG. 8.

3. FIGS. 9 and 10 show enlarged portions of the fabric of FIG. 8. FIG. 10 is an enlarged portion of a closed area (CA) of the fabric of FIG. 8.

FIG. 11 shows a cross-sectional view of a closed area (CA) (129) of the fabric of FIG. 8. FIG. 11 shows the base fabric (113) as having a 0.85 mm thickness. FIG. 11 shows the laminated film (105) having a 2.93 mm thickness. No macro or micro voids are present in the second layer (the film) in the belt portion depicted in FIG. 11.

Figure 12:
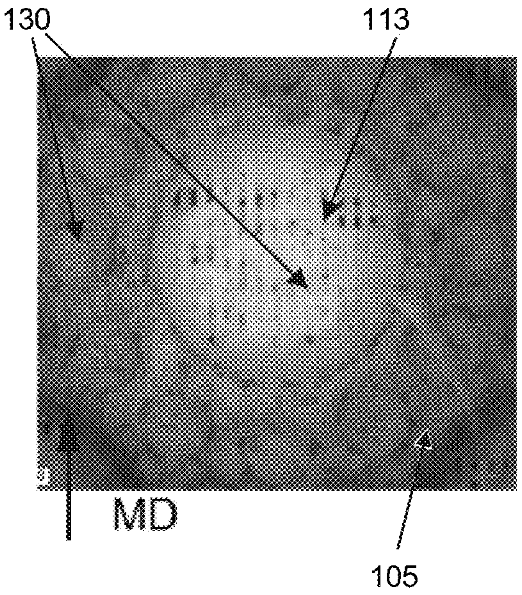
FIG. 12 illustrates nonwoven product fibers interacting with a belt of the invention.
Figure 13:
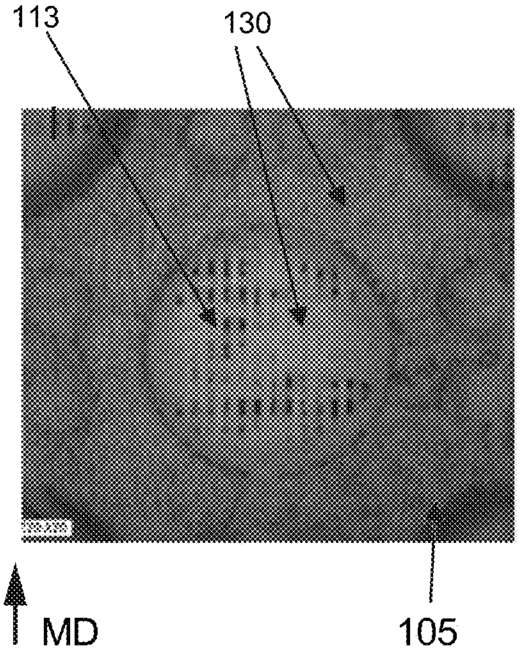
FIG. 13 illustrates nonwoven product fibers interacting with a belt of the invention.

FIGS. 12 and 13 show a top-down view of nonwoven product fibers (130) interacting with the belt having a film (105) of FIG. 2 laminated to a base fabric (113) of FIG. 3.

Figure 14:
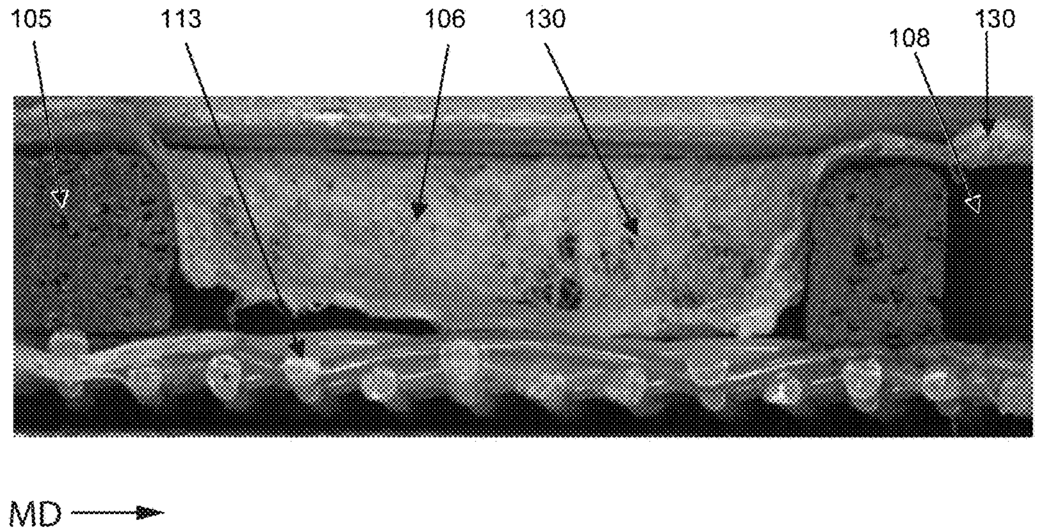
FIG. 14 illustrates a cross-sectional view of nonwoven product fibers interacting with a belt of the invention.
Figure 15:
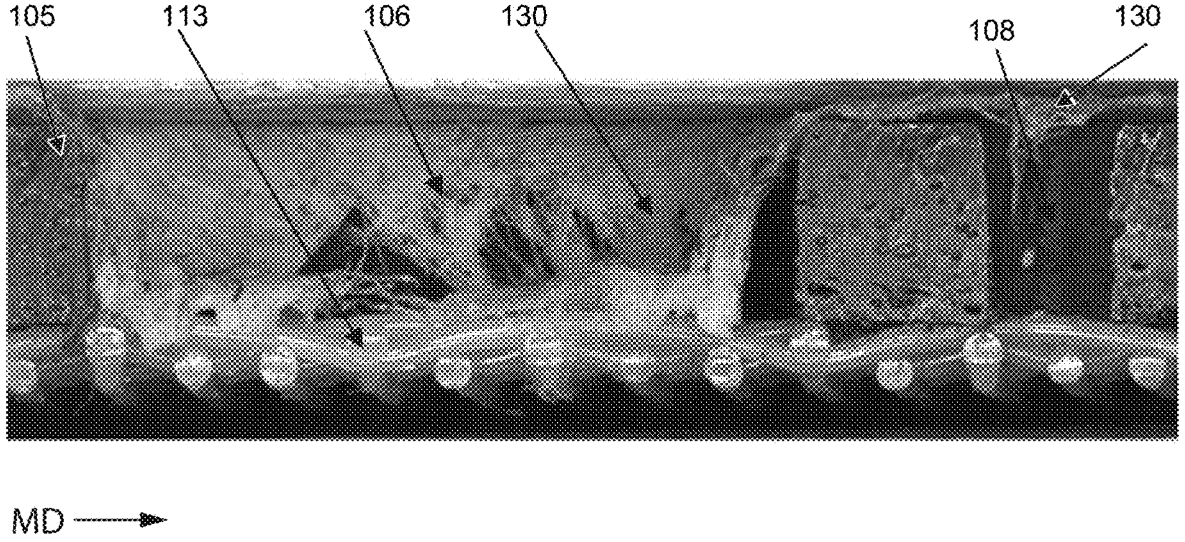
FIG. 15 illustrates a cross-sectional view of nonwoven product fibers interacting with a belt of the invention.

FIGS. 14 and 15 show a cross-sectional view of nonwoven product fibers (130) interacting with a belt having a film (105) of FIG. 2 laminated to a base fabric (113) of FIG. 3. Here, fibers of a nonwoven product produced on the belt can be seen pulled into and entering a macro void (106) of the laminated film layer, but bridging a micro void (108) of the laminated film. Here, the fibers bridge the micro void by extending over the void from one side of the micro void to the other side of the micro void. In some instances, the fibers will entirely bridge the void without any fiber entering the micro void space. In other instances a portion, but not a substantial portion, of the fibers may enter the micro void space while the remainder extend from one side of the micro void to the other side of the micro void.

Modifications to the above would be obvious to those of ordinary skill in the art, but would not bring the invention so modified beyond the scope of the present invention. The claims to follow should be construed to cover such situations.

The invention claimed is:

1. An industrial fabric for producing a textured product, the industrial fabric comprising:

a first layer;

a second layer extending over at least a portion of a top surface of the first layer, wherein the second layer comprises a plurality of macro voids and micro voids, wherein the macro voids are configured to impart a texture into the textured product produced thereon, wherein the micro voids are configured to limit penetration of fibers of the textured product into the micro voids; and a permeability being at least 300 CFM, a nominal diameter of the macro voids being in a range from 6 mm to 12 mm, a nominal diameter of the micro voids being in a range from 1 mm to 5 mm, and a total area of the micro voids being at least about 45% of a total area of the macro voids.

2. The industrial fabric of claim 1, wherein the micro voids are configured to increase the permeability of the industrial fabric.

3. The industrial fabric of claim 1, wherein the macro voids are configured such that the fibers of the textured product stretch and/or bend into the macro voids.

4. The industrial fabric of claim 1, wherein the second layer is a nonwoven layer.

5. The industrial fabric of claim 1, wherein the second layer comprises a material selected from the group consisting of: engineered polymers, thermoplastics, thermoplastic polyurethane, elastomers, cross-linked plastics, rubbers, polyamides, polyesters, co-polyesters, EVA (ethylene-vinyl acetate), and combinations thereof.

6. The industrial fabric of claim 1, wherein the first layer is a base fabric selected from the group consisting of: woven fabrics, nonwovens, machine direction yarn arrays, cross-machine direction yarn arrays, braids, a series of independent rings, spiral linked, extruded meshes, and knitted structures.

7. The industrial fabric of claim 1, wherein at least a portion of the macro and/or micro voids in the second layer are in a shape selected from the group consisting of: circular, elliptical, polygonal, and lobate.

8. The industrial fabric of claim 1, wherein the second layer extends over the entire length and/or width of the first layer.

9. The industrial fabric of claim 1, wherein the permeability of the industrial fabric is between 400-700 CFM.

10. The industrial fabric of claim 1, wherein the second layer is laminated to the first layer.

11. The industrial fabric of claim 1, wherein the second layer is a film.

12. The industrial fabric of claim 1, wherein the macro voids and micro voids are laser-created voids and/or drilled voids.

13. The industrial fabric of claim 11, wherein the film comprises a compound selected from the group consisting of: engineered polymers, thermoplastics, thermoplastic polyurethane, elastomers, cross-linked plastics, rubbers, polyamides, polyesters, co-polyesters, EVA, and combinations thereof.

14. The industrial fabric of claim 1, wherein the macro voids are a topographical feature of the second layer and are complementary to a desired texture in the textured product.

15. The industrial fabric of claim 1, wherein the macro voids have a void volume in the range of 50 to 90 $mm^3$.

16. The industrial fabric of claim 1, wherein the micro voids have a void volume in the range of 20 to 50 $mm^3$.

17. The industrial fabric of claim 1, comprising a closed area of about 5% to about 95%.

18. The industrial fabric of claim 1, comprising an effective closed area of about 5% to about 95%.

19. The industrial fabric of claim 1, wherein the micro voids are configured such that the fibers of the textured product bridge the micro voids.

20. The industrial fabric of claim 1, wherein the first layer is selected from the group consisting of: a woven fabric and a nonwoven fabric.

21. The industrial fabric of claim 1, wherein the industrial fabric is a papermaking fabric, a texturing belt, or a processing belt.

22. The industrial fabric of claim 1, wherein the permeability of the industrial fabric is at least partially determined by the total area of the micro voids and the total area of the macro voids.

23. The industrial fabric of claim 22, wherein the total area of the macro voids is about 39%.

24. The industrial fabric of claim 23, wherein the total area of the micro voids is at least about 17%.

25. The industrial fabric of claim 1, wherein the permeability is about 538 CFM and a total area of the macro voids is about 39%.

26. The industrial fabric of claim 1, wherein the second layer is formed of a film adhered or laminated to the first layer.

27. The industrial fabric of claim 1, wherein the micro voids comprise a plurality of different sizes.

* * * * *